(12) United States Patent
Phan et al.

(10) Patent No.: US 12,679,018 B2
(45) Date of Patent: Jul. 14, 2026

(54) METHOD FOR FORMING AN ORAL APPLIANCE

(71) Applicant: Smylio Inc., Fremont, CA (US)

(72) Inventors: Loc Phan, Santa Clara, CA (US); Huong Dinh, San Jose, CA (US)

(73) Assignee: Smylio Inc., Fremont, CA (US)

( * ) Notice: Subject to any disclaimer, the term of this patent is extended or adjusted under 35 U.S.C. 154(b) by 2 days.

(21) Appl. No.: 18/707,153

(22) PCT Filed: Nov. 7, 2022

(86) PCT No.: PCT/US2022/079421
§ 371 (c)(1),
(2) Date: Jun. 3, 2024

(87) PCT Pub. No.: WO2023/081903
PCT Pub. Date: May 11, 2023

(65) Prior Publication Data
US 2025/0026067 A1      Jan. 23, 2025

Related U.S. Application Data

(60) Provisional application No. 63/276,446, filed on Nov. 5, 2021.

(51) Int. Cl.
*B29C 51/26* (2006.01)
*B32B 3/30* (2006.01)
(Continued)

(52) U.S. Cl.
CPC .............. *B29C 51/266* (2013.01); *B32B 3/30* (2013.01); *B32B 27/08* (2013.01); *B32B 27/18* (2013.01);
(Continued)

(58) Field of Classification Search
None
See application file for complete search history.

(56) References Cited

U.S. PATENT DOCUMENTS

| | | | |
|---|---|---|---|
| 2009/0298005 A1 | 12/2009 | Schwartz | |
| 2018/0333226 A1* | 11/2018 | Tsai | B29C 51/46 |
| 2018/0368961 A1* | 12/2018 | Shanjani | A61B 5/4547 |
| 2022/0409335 A1* | 12/2022 | Osmani | A61C 7/08 |

FOREIGN PATENT DOCUMENTS

| | | |
|---|---|---|
| DE | 202013001392 U1 | 5/2013 |
| WO | 2010043419 A1 | 4/2010 |

(Continued)

OTHER PUBLICATIONS

Matos T., International Search Report & Written Opinion for PCT/US2022/079421, Jan. 27, 2023.

(Continued)

*Primary Examiner* — Abbas Rashid
*Assistant Examiner* — Gregory C. Grosso
(74) *Attorney, Agent, or Firm* — MT HUNT LAW; Marcus T. Hunt

(57) ABSTRACT

In methods for constructing orthodontic appliances constructed from multiple layers or shells, solvents can be utilized to bond the multiple layers or shells together. Such a construction technique overcomes the aforementioned issues with utilizing preformed laminates and also allows for addition of agents between the layers when the appliance is constructed.

18 Claims, 2 Drawing Sheets

(51) Int. Cl.

| | |
|---|---|
| *B32B 27/08* | (2006.01) |
| *B32B 27/18* | (2006.01) |
| *B32B 27/36* | (2006.01) |
| *B32B 27/40* | (2006.01) |
| *A61C 7/08* | (2006.01) |
| *B29K 67/00* | (2006.01) |
| *B29K 75/00* | (2006.01) |
| *B29K 105/00* | (2006.01) |
| *B29L 31/00* | (2006.01) |

(52) U.S. Cl.
CPC .............. *B32B 27/36* (2013.01); *B32B 27/40* (2013.01); *A61C 7/08* (2013.01); *B29K 2067/003* (2013.01); *B29K 2075/00* (2013.01); *B29K 2105/0035* (2013.01); *B29K 2995/0082* (2013.01); *B29L 2031/753* (2013.01); *B32B 2250/24* (2013.01); *B32B 2274/00* (2013.01); *B32B 2307/546* (2013.01); *B32B 2535/00* (2013.01)

(56) References Cited

FOREIGN PATENT DOCUMENTS

| | | | |
|---|---|---|---|
| WO | 2018064782 A1 | 4/2018 |
| WO | 2021030284 A1 | 2/2021 |
| WO | 2021078422 A1 | 4/2021 |

OTHER PUBLICATIONS

Roche O., Extended European Search Report and Search Opinion issued by the European Patent Office for European patent application EP 22891148.3, Jun. 27, 2025.

Ahn et al., A new type of clear orthodontic retainer incorpoarating multi-layer hybrid materials; The Korean Journal of Orthodontics, vol. 5; pp. 268-272, Jun. 10, 2015; retrieved from the Internet: <URL: https://synapse.koreamed.org/articles/1081146> entire document.

* cited by examiner

10

10

18

16

14

20

18

16

14

METHOD FOR FORMING AN ORAL APPLIANCE

CROSS-REFERENCE TO RELATED APPLICATIONS

This application is a national stage application pursuant to 35 U.S.C. § 371 of International Application No. PCT/US2022/079421, filed Nov. 7, 2022, which claims the benefit of U.S. provisional patent application No. 63/276,446, filed on Nov. 5, 2021, the entireties of which are incorporated by reference herein.

BACKGROUND

An objective of orthodontics is to move a patient's teeth to positions where function and/or aesthetics are optimized. Traditionally, appliances such as braces are applied to a patient's teeth by a treating practitioner and the set of braces exerts continual force on the teeth and gradually urges them toward their intended positions. Over time and with a series of clinical visits and reactive adjustments to the braces by the practitioner, the appliances to move the teeth toward their final destination.

More recently, alternatives to conventional orthodontic treatment with traditional affixed appliances (e.g., braces) have become available. For example, systems including a series of molded plastic aligners have become commercially available from Align Technology, Inc., San Jose, Calif., under the trade name Invisalign® System. The Invisalign® System is described in numerous patents and patent applications assigned to Align Technology, Inc. including, for example in U.S. Pat. Nos. 6,450,807, and 5,975,893. Such aligners are commonly called "clear" aligners due to a transparent plastic construction. Similarly constructed (i.e., thicker) clear retainers (e.g. ESSIX retainers) also exist as a post-procedure option for orthodontic patients.

Currently, market-leading clear aligners have a layered construction of two or more layers of polymer materials. A laminate, which includes the two or more layers, is typically employed to thermoform a clear aligner. Laminate construction can be achieved by application of heat and pressure onto preformed sheets of material or as the laminate is extruded out of an extrusion machine. The disadvantages of laminates are that relative degree of bond strength between laminated layers may not be uniform with respect to different production batches and even with respect to differing locations on the same laminate sheet, and hence can result the production of ineffective or less effective aligners because of varying degrees of delamination. A degree of delamination can also occur in the thermoforming process.

A major disadvantage that exists today is the lack of availability of laminate materials that has varying laminate configurations such as the thicknesses of the individual layers and/or the polymer types across the individual layers. Although laminate materials produced by co-extrusion is a common practice world-wide, thin laminates of differing hardness values and/or materials in multilayer configuration are difficult to acquire because of lack of commercial availability, which is due to in-part, a high barrier to entry due to large capital investment costs combined with a relatively small market that impedes investment.

In addition, another major disadvantage of all commonly market available co-extruded laminate materials is the inability to incorporate agents for controlled release applications (e.g., drug elution) to be added between the layers in a practical manner.

SUMMARY OF THE INVENTION

Embodiments of the invention relate to orthodontic appliances, materials, and methods as summarized in the following paragraphs. In some embodiments, some embodiments relate to a method for forming an orthodontic appliance. In some embodiments, a first layer having a first concave surface shaped to fit onto teeth can be thermoformed. In some embodiments, a second layer having a second concave surface shaped to fit onto the first layer can be thermoformed. In some embodiments, the first layer can be bonded to the second layer using a solvent to form a multilayer orthodontic appliance.

In some embodiments, the solvent can be a pure or diluted alcohol, acetone, ethanol, ethanol mixture, isopropyl alcohol, eugenol, reagent alcohol, n-butyl Acetate, or amyl acetate.

In some embodiments, one or more of a therapeutic and/or wear-enhancing agent can be added to the first and second layers prior to or during bonding of the first and second layers.

In some embodiments, the solvent can include one or more of a miscible or soluble therapeutic and/or one or more of a miscible or soluble wear-enhancing agent.

In some embodiments, the first layer and/or second layer can be polyethylene terephthalate glycol (PETG).

In some embodiments, the first layer and/or second layer can be thermoplastic urethane.

BRIEF DESCRIPTION OF THE DRAWINGS

For a better understanding of at least certain embodiments, reference will be made to the following Detailed Description, which is to be read in conjunction with the accompanying drawings.

Figure 1:
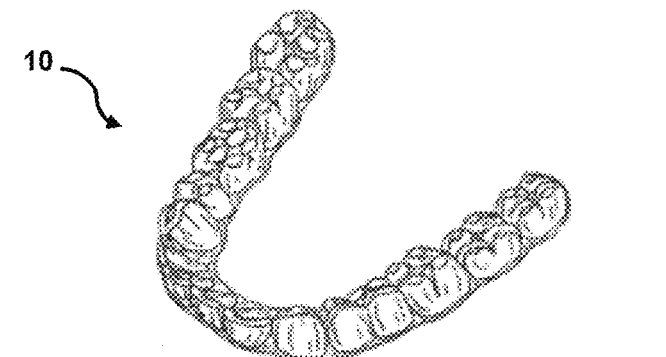
FIG. 1 is a perspective view of an orthodontic appliance, according to some embodiments.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Embodiments are disclosed that relate to methods for constructing orthodontic appliances constructed from multiple layers or shells. In some embodiments, solvents can be utilized to bond the multiple layers or shells together. Such a construction technique overcomes the aforementioned issues with utilizing preformed laminates and also allows for addition of agents between the layers when the appliance is constructed.

In some embodiments, such solvent can be a fluid that can plasticize the material surfaces of the layers and allow the polymer chains of the two materials to partially migrate into the matrixes of one another. When the solvent is removed, the polymer chains that penetrated the matrix of one another become trapped and created an interlayer adhesion. The degree of interlayer adhesion can vary depending on the intermolecular compatibility between the solvent and the two materials and the two materials themselves.

In some embodiments, the amount of time that the materials are exposed to the solvents can affect the degree of interlayer adhesion. For a given solvent, the materials/solvent exposure times are directly related to the polymer chains across layer penetrations and the layer-to-layer adhesion strength.

Embodiments disclosed herein prevent the need to utilize conventional processes to create laminates, and therefore overcome the disadvantages disclosed above. A normal co-extrusion process to form a laminate requires heat and pressure to make the polymer chains of each layer to become mobile and moves to penetrate the across the layer to create the interlayer bond. In some embodiments, rather than extrusion machinery, a solvent causes the polymer chains to become mobile and penetrate the matrix of the across material layer. The solvent can also soften the across material layer making to better enable penetration.

In some embodiments, first of the two materials, the solvent causes the polymer chain mobility. Second of the two, the heat causes the polymer chain mobility. This way, in the end, the heat will drive all the solvents from system, leaving none behind to bring about delamination.

Before the present invention is described in greater detail, it is to be understood that this invention is not limited to particular embodiments described, as such can, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges can independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which can be readily separated from or combined with the features of any of the other several embodiments without departing from the scope or spirit of the present invention. Any recited method can be carried out in the order of events recited or in any other order that is logically possible.

FIG. 1 illustrates orthodontic appliance 10, which can be worn by a patient in order to achieve an incremental repositioning of individual teeth or for the purpose of retaining position of moved teeth after completion of an orthodontic treatment (i.e., a "retainer"). In some embodiments, orthodontic appliance 10 can be formed from a laminate of suitable layers of polymeric material. Orthodontic appliance 10 can fit over all teeth present in an upper or lower jaw, or less than all of the teeth.

In some embodiments, only certain teeth received by an appliance will be repositioned by the appliance while other teeth can provide a base or anchor region for holding the appliance in place as it applies force against the tooth or teeth targeted for repositioning. In some cases, many or most, and even all, of the teeth will be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual anchors on teeth with corresponding receptacles or apertures in the appliance so that the appliance can apply a selected force on the tooth. Basic methods for determining an orthodontic treatment plan using a series of incremented appliances as well as instructions for molding orthodontic appliances are well known, and, for example, are described in U.S. Pat. Nos. 6,450,807, and 5,975,893, which are incorporated by reference herein, but only to an extent that those references do not contradict the newer teachings disclosed herein.

An appliance can be designed and/or provided as part of a set of a plurality of appliances. In such an embodiment, each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. A target tooth arrangement can be a planned final tooth arrangement selected for the patient's teeth at the end of all planned orthodontic treatment. Alternatively, a target arrangement can be one of many intermediate arrangements for the patient's teeth during the course of orthodontic treatment. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

The orthodontic appliances can be generated all at the same stage or in sets or batches, e.g., at the beginning of a stage of the treatment, and the patient wears each appliance until the pressure of each appliance on the teeth can no longer be felt or has resulted in the maximum amount of expressed tooth movement for that given stage. A plurality of different appliances (e.g., set) can be designed and even fabricated prior to the patient wearing any appliance of the plurality. After wearing an appliance for an appropriate period of time, the patient replaces the current appliance with the next appliance in the series until no more appliances remain. The orthodontic appliances are generally not affixed to the teeth and the patient may place and replace the appliances at any time during the procedure (e.g., patient-removable appliances).

Figure 2A:
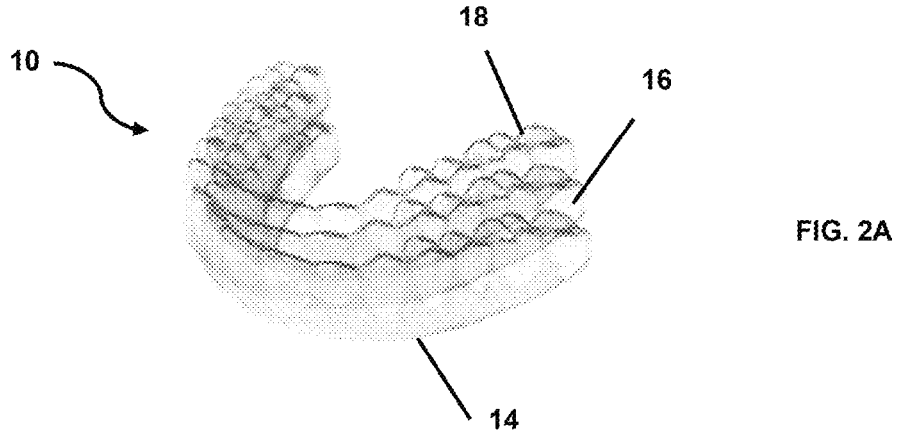
FIG. 2A is an exploded view of an orthodontic appliance, according to some embodiments.
Figure 2B:
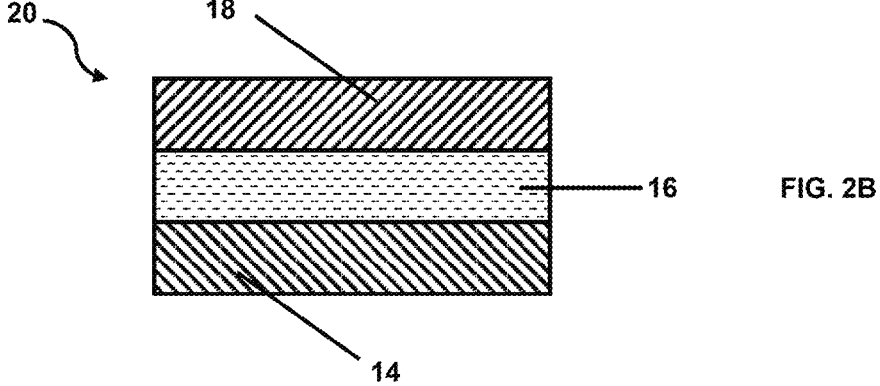
FIG. 2B is a cross-section of a laminate material, according to some embodiments.

FIG. 2A shows an exploded view of orthodontic appliance 10. Orthodontic appliance 10 can include first layer 14 having a concave teeth engaging surface and convex outer surface, second layer 16 over first layer 14 and third layer 18 over second layer 16, where third layer 18 includes a convex outer surface that is exposed to the oral cavity. In some embodiments, second layer 16 and/or third layer 18 can be constructed identically with respect to first layer or nearly so. In some embodiments, one or more additional layers can be located between first layer 14 and second layer 16 and/or between second layer 16 and third layer 18. In some embodiments, third layer 18 is not included and therefore only first layer 14 and second layer 16 are included, where the convex outer surface of second layer 16 is exposed to the oral cavity.

While the orthodontic appliance 10 is shown in an exploded view for the purpose of better understanding, the layers of the orthodontic appliance 10 are intended to be bonded by the process and/or processes disclosed herein to have desired physical properties that are equivalent or better to a prelaminated sheet. In some embodiments, all or some of the convex surface of first layer 14 is bonded to the concave surface of second layer 16. In some embodiments, all or some of the convex surface of second layer 16 is bonded to the concave surface of third layer 18.

In some embodiments of the invention include orthodontic appliance 10 can have one or more transparent layers bonded over a translucent layer or an opaque layer, as described in co-assigned international patent application no. PCT/US2020/023029, which is incorporated by reference.

In some embodiments, one or more of first layer 14, second layer 16, and third layer 18 can have thicknesses ranging from 0.001-0.040 inches (0.025-1.02 mm) thick. In some embodiments, the total thickness of laminate material 20 can range from 0.020-0.050 inches (0.51-1.27 mm). In some embodiments, first layer 14, second layer 16, and/or third layer 18 are 0.015 inches thick prior to forming (e.g. thermoforming) laminate material 20 into appliance 10. In some embodiments, first layer 14, second layer 16, and/or third layer 18 are 0.010 inches thick prior to forming (e.g. thermoforming) laminate material 20 into appliance 10.

In some embodiments, first layer 14, second layer 16, and third layer 18 can be constructed from one or polymers such as a polyester, a copolyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate or a combination thereof. In some embodiments, first layer 14, second layer 16, and third layer 18 can be constructed from polyethylene terephthalate glycol (PETG). In some embodiments, first layer 14, second layer 16, and third layer 18 can be constructed from a thermoplastic polyurethane, such as ISOPLAST by Lubrizol Corporation.

In some embodiments, first layer 14 and third layer 18 are each transparent and formed from one or more polymers. In some embodiments, to provide a long service life when oral appliance 10 is a retainer, first layer 14 and/or third layer 18 are selected from materials having high impact resistance.

Figure 3:
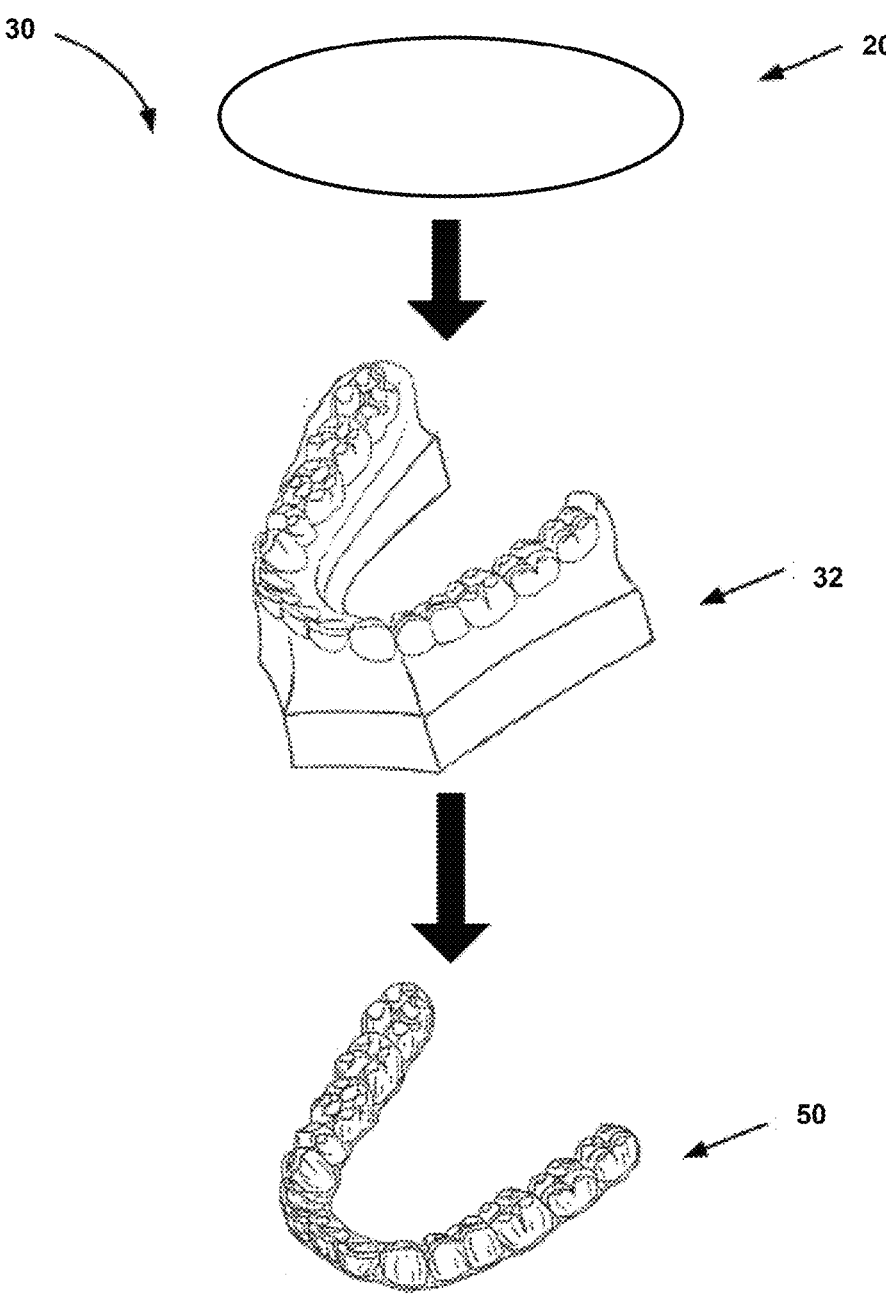
FIG. 3 is a perspective view of a process for molding an orthodontic appliance, according to some embodiments.

FIG. 3 depicts an example of process 30 for forming a layer for an orthodontic appliance. As shown, material 40 can be formed into layer 50 (which can be, for example, one of the first layer 14, second layer 16, or third layer 18). In this example process, layer 50 can be produced with the use of physical tooth model, or mold, 32. In some embodiments, layer 50 is dimensioned (e.g., 120 mm and/or 125 mm diameter circle) for ready processing on a commercially available forming device (e.g., Erkoform®, Erkoform-3Dmotion®, Biostar®, Ministar S®, Drufomat Scan®, Drufosmart®, Essix® SelectVac®). Guidelines for operating such forming devices can be found at Scheu Dental Technology, *Biostar Operating Manual*, DE/GB/FR/IT/ES/ 1.000/06/19 G REF PM 0113.01; Scheu Dental Technology, *Application booklet for the pressure moulding technique*, GB 2.000/07/19 G REF 0111.02; Erkodent, *Thermoforming*, S15-3106-48; Erkodent, *Erkoform 3D,* 61-8002-2; Erkodent, *Erkoform-3D+ Instructions*, BA-Erkoform-3d+-anl-EN-04-04-2019, which are incorporated by reference herein.

Layer 50 can be produced by heating laminate material 20 and then vacuum or pressure forming the material over the teeth in the physical tooth model 32, and then trimming excess material after removal from the mold. Accordingly, layer 50 is a direct representation of physical tooth model 32. One or more additional layers, which can be physically shaped to be identical or non-identical to layer 50 and/or made of the same material or different material to layer 50, can also be made using the same process using physical tooth model 32 or a different tooth model.

In some embodiments, the resultant layers 50 can be bonded after molding to form orthodontic appliance 10 with the strength suitable to provide orthodontic therapy. In some embodiments, an adhesive (e.g., solvent, cyanaculate, silicone, epoxy) can be used to bond the layers. In the prior art, adhesives are rarely, if ever, used for construction of commercial orthodontic appliances, such as clear aligners, because of toxicity concerns and manufacturability concerns. To address toxicity, in some embodiments, bonding solvents can have minimal toxicity (e.g., food grade solvents) properties and/or relatively low boiling points (e.g., acetone) so as to evaporate completely at room temperature, because elevated temperature curing can be detrimental to some layer materials. However, in some embodiments, heat can be used (e.g., kiln drying) to evaporate solvent out from the orthodontic appliance. Suitable solvents can include pure or diluted: alcohol acetone, nondenatured ethanol, nondenatured ethanol mixtures (e.g., consumable spirits, isoamyl acetate in ethanol (banana oil), vanilla extract, herb extracts), isopropyl alcohol, eugenol, reagent alcohol, n-butyl Acetate, N,N-Dimethylacetamide, or amyl acetate.

Solvents can be applied by dripping, brushing, dipping, misting, or spraying the layers 50 with solvent. Unwanted air bubbles between the layers (where bonding will not occur) can easily be seen during this process and therefore easily corrected (e.g., by adding pressure or more solvent) or identified and rejected. In a practical setting, forming oral appliances utilizing a preformed laminate carries the risk of numerous assumptions based on quality control sampling, and therefore some appliances will fail or be ineffective without the ability to foresee or correct. Here, because bonding the layers 50 is performed in an individual appliance basis, rather than on relatively large sheet of raw material, issues with delamination issues associated with preformed laminates are unlikely because 100% quality control is practically implemented and easily verified.

In some embodiments, one or more agents can be added between the layers along with or prior to applying the adhesive. In some embodiments, the one or more agents can be configured to elute from the orthodontic appliance while being worn by a patient. In some embodiments, the one or more agents have therapeutic, flavor, breath enhancing, and/or pH balancing properties for improving health and/or enhancing appliance wear experience. In some embodiments, the agents can be soluble or miscible with a solvent. In some embodiments, the agents can be carried by a solvent and applied to the layers with the solvent. In some embodiments, the solvent enables the one or more agents to migrate between the polymer chains of the layers when the solvent plasticizes the layers and remain after the solvent disperses.

In some embodiments, such agents can include flavoring agents (e.g., of the Mentha genus, Allyl hexanoate, Manzanate, Diacetyl, Acetylpropionyl, Acetoin, Isoamyl acetate, 1-Methyl-4-(prop-1-en-2-yl)cyclohex-1-ene, Benzaldehyde, Ethyl propionate, Ethyl maltol, Methyl salicylate, Methyl 2-aminobenzoate, (2E)-3-Phenylprop-2-enal, Methyl 2-aminobenzoate, 3-Ethoxy-4-hydroxybenzaldehyde, Ethyl (2E, 4Z)-deca-2,4-dienoate flavoring), fluoride components (e.g., $CaF_2$, Na, $SF_6$, $Na_2SiF_6$, SnF), pH balancing agents (e.g., xylitol, bases), Anesthetics (e.g., Eugenol, SnF), pharmaceuticals for general use (e.g., health supplements, diet supplements, minerals (e.g., calcium, magnesium, iron, zinc, and chromium), vitamins (e.g., A, B, C, D, E, K) folic acid, melatonin, caffeine, and probiotics), and pharmaceuticals for specific conditions (e.g., antibiotics, steroids, vaccines, hormones, contraceptives, antihistamines, blood thinners, antidepressants, insulin, chemotherapy, anti-virals, inflammation inhibitors, antacids, opiods, CNS depressants, and stimulants).

In some embodiments, a health care provider who initiates the production of an orthodontic appliance can customize which one or more agents are included between the layers. For example, the health care provider can select one or more particular therapeutic agents and one or more particular flavoring agents according the particular health care needs and/or desires of a patient. Such an ordering process would not be practical utilizing preformed sheets of laminated material.

Flexural strength testing per ASTM D-790 and flexural modulus testing per ASTM D-790 was performed on flat, 2-layer samples, with each layer being 0.015 inches (0.381 mm) thick. Samples of tables 1.1-1.9 were constructed from layers of PETG and thermoplastic urethane (EASTAR Grade 6763)/ISOPLAST Grade 2530). Samples of tables 2.1-2.9 were constructed from dual layers of the same thermoplastic urethane (ISOPLAST Grade 2530).

To determine a baseline/control values, two testing samples of each type were bonded as shown in Table 1.1 and 2.1. The construction method for the baseline samples (heat lamination) did not employ use of adhesives and prior testing has shown this method to be suitable for construction of orthodontic appliance 10. Two testing samples of both construction types were bonded using isopropyl alcohol, acetone, eugenol, reagent alcohol, nondenatured ethanol, N,N-Dimethylacetamide, n-butyl Acetate, and amyl acetate. The solvents were mist sprayed and allowed to air dry.

Results of the testing are shown in the tables below. For the PETG/ISOPLAST samples, it was found that eugenol, isopropyl alcohol, and n-butyl Acetate provided comparable or greater flexural strength and flexural modulus than the control sample, and accordingly for these materials those solvents can likely be substituted for the baseline construction method for orthodontic appliance 10. It is possible that the remaining solvents can still provide enough strength for orthodontic appliance 10, but more testing is required.

For the ISOPLAST/ISOPLAST samples, it was found that acetone, eugenol, and n-butyl Acetate provided comparable or greater flexural strength and flexural modulus than the control sample, and accordingly for these materials those solvents can likely be substituted for the baseline construction method for orthodontic appliance 10. It is possible that the remaining solvents can still provide enough strength for orthodontic appliance 10, but more testing is required.

TABLE 1.1

PETG/ISOPLAST, Baseline

|  | Flexural Strength (Mpa) | Flexural Modulus (Mpa) |
| --- | --- | --- |
| Sample 1 | 30.8 | 1508.3 |
| Sample 2 | 33.2 | 1766.9 |
| Mean | 32 | 1637.6 |

TABLE 1.2

PETG/ISOPLAST, Isopropyl Alcohol

|  | Flexural Strength (Mpa) | Flexural Modulus (Mpa) |
| --- | --- | --- |
| Sample 1 | 38.3 | 1508.3 |
| Sample 2 | 37.7 | 1349.7 |
| Mean | 38 | 1429 |

TABLE 1.3

PETG/ISOPLAST, Acetone

|  | Flexural Strength (Mpa) | Flexural Modulus (Mpa) |
| --- | --- | --- |
| Sample 1 | 21.2 | 1183.1 |
| Sample 2 | 25.4 | 1262.5 |
| Mean | 23.3 | 1222.8 |

TABLE 1.4

PETG/ISOPLAST, Eugenol

|  | Flexural Strength (Mpa) | Flexural Modulus (Mpa) |
| --- | --- | --- |
| Sample 1 | 40.2 | 1974.2 |
| Sample 2 | 41.3 | 2014.2 |
| Mean | 40.75 | 1994.2 |

TABLE 1.5

PETG/ISOPLAST, Reagent Alcohol

|  | Flexural Strength (Mpa) | Flexural Modulus (Mpa) |
| --- | --- | --- |
| Sample 1 | 15.9 | 975.1 |
| Sample 2 | 14.1 | 965.2 |
| Mean | 15 | 970.15 |

TABLE 1.6

PETG/ISOPLAST, Nondenatured Ethyl Alcohol

|  | Flexural Strength (Mpa) | Flexural Modulus (Mpa) |
|---|---|---|
| Sample 1 | 15.8 | 967.7 |
| Sample 2 | 15.5 | 915.6 |
| Mean | 15.65 | 941.65 |

TABLE 1.7

PETG/ISOPLAST, Amyl acetate

|  | Flexural Strength (Mpa) | Flexural Modulus (Mpa) |
|---|---|---|
| Sample 1 | 15.1 | 895.3 |
| Sample 2 | 15.8 | 984.5 |
| Mean | 15.45 | 939.9 |

TABLE 1.8

PETG/ISOPLAST, N,N-Dimethylacetamide

|  | Flexural Strength (Mpa) | Flexural Modulus (Mpa) |
|---|---|---|
| Sample 1 | 25.4 | 1090.2 |
| Sample 2 | 27.9 | 1190.2 |
| Mean | 26.65 | 1140.2 |

TABLE 1.9

PETG/ISOPLAST, n-butyl Acetate

|  | Flexural Strength (Mpa) | Flexural Modulus (Mpa) |
|---|---|---|
| Sample 1 | 29.4 | 1488.8 |
| Sample 2 | 31.2 | 1865.2 |
| Mean | 30.3 | 1677 |

TABLE 2.1

ISOPLAST/ISOPLAST, Baseline

|  | Flexural Strength (Mpa) | Flexural Modulus (Mpa) |
|---|---|---|
| Sample 1 | 21.9 | 1257.3 |
| Sample 2 | 22.3 | 1422.3 |
| Mean | 22.1 | 1339.8 |

TABLE 2.2

ISOPLAST/ISOPLAST, Isopropyl Alcohol

|  | Flexural Strength (Mpa) | Flexural Modulus (Mpa) |
|---|---|---|
| Sample 1 | 15.7 | 887.1 |
| Sample 2 | 15.9 | 889.3 |
| Mean | 15.8 | 888.2 |

TABLE 2.3

ISOPLAST/ISOPLAST, Acetone

|  | Flexural Strength (Mpa) | Flexural Modulus (Mpa) |
|---|---|---|
| Sample 1 | 21.1 | 1109.6 |
| Sample 2 | 23.8 | 1325.2 |
| Mean | 22.45 | 1217.4 |

TABLE 2.4

ISOPLAST/ISOPLAST, Eugenol

|  | Flexural Strength (Mpa) | Flexural Modulus (Mpa) |
|---|---|---|
| Sample 1 | 29.5 | 1522.3 |
| Sample 2 | 26.8 | 1355.9 |
| Mean | 28.15 | 1439.1 |

TABLE 2.5

ISOPLAST/ISOPLAST, Reagent Alcohol

|  | Flexural Strength (Mpa) | Flexural Modulus (Mpa) |
|---|---|---|
| Sample 1 | 15.9 | 975.1 |
| Sample 2 | 14.1 | 882.2 |
| Mean | 15 | 928.65 |

TABLE 2.6

ISOPLAST/ISOPLAST, Ethyl Alcohol

|  | Flexural Strength (Mpa) | Flexural Modulus (Mpa) |
|---|---|---|
| Sample 1 | 18.6 | 1094.5 |
| Sample 2 | 16.8 | 1025.3 |
| Mean | 17.7 | 1059.9 |

TABLE 2.7

ISOPLAST/ISOPLAST, Amyl acetate

|  | Flexural Strength (Mpa) | Flexural Modulus (Mpa) |
|---|---|---|
| Sample 1 | 19.4 | 1022.7 |
| Sample 2 | 17.4 | 965.4 |
| Mean | 18.4 | 994.05 |

TABLE 2.8

ISOPLAST/ISOPLAST, N,N-Dimethylacetamide

|  | Flexural Strength (Mpa) | Flexural Modulus (Mpa) |
|---|---|---|
| Sample 1 | 16.8 | 995.1 |
| Sample 2 | 18.2 | 1038.5 |
| Mean | 17.5 | 1016.8 |

TABLE 2.9

| ISOPLAST/ISOPLAST, n-butyl Acetate | | |
| --- | --- | --- |
| | Flexural Strength (Mpa) | Flexural Modulus (Mpa) |
| Sample 1 | 31.5 | 1488.8 |
| Sample 2 | 33.2 | 1535.2 |
| Mean | 32.35 | 1512 |

Throughout the foregoing description, and for the purposes of explanation, numerous specific details are set forth in order to provide a thorough understanding of the described techniques. It will be apparent, however, to one skilled in the art that these techniques can be practiced without some of these specific details. Although various embodiments that incorporate these teachings have been shown and described in detail, those skilled in the art could readily devise many other varied embodiments or mechanisms to incorporate these techniques. Also, embodiments can include various operations as set forth above, fewer operations, or more operations; or operations in an order. Accordingly, the scope and spirit of the invention should be judged in terms of the claims, which follow as well as the legal equivalents thereof.

What is claimed is:

1. A method for forming an orthodontic appliance, the method comprising:
thermoforming a first layer to have a first concave surface shaped to fit onto teeth;
thermoforming a second layer to have a second concave surface shaped to fit onto the first layer; and
bonding the first layer to the second layer using a solvent to form a multilayer orthodontic appliance;
wherein the solvent includes one or more of a miscible or soluble therapeutic and/or one or more of a miscible or soluble wear-enhancing agent.

2. The method of claim 1, wherein the solvent is a pure or diluted alcohol, acetone, ethanol, ethanol mixture, isopropyl alcohol, eugenol, reagent alcohol, n-butyl Acetate, or amyl acetate.

3. The method of claim 1, wherein one or more of a therapeutic and/or wear-enhancing agent is added to the first and second layers prior to or during bonding of the first and second layers.

4. The method of claim 1, wherein the first layer and/or second layer comprise polyethylene terephthalate glycol (PETG).

5. The method of claim 1, wherein the first layer and/or second layer comprise thermoplastic urethane.

6. The method of claim 1, wherein the solvent is a food grade solvent.

7. The method of claim 1, wherein the solvent has a relatively low boiling point so as to evaporate completely at room temperature.

8. The method of claim 1, wherein the included one or more agent includes a flavoring agent, fluoride component, pH balancing agent, anesthetic, pharmaceutical, or vitamin.

9. The method of claim 1, wherein the solvent enables the included one or more agent to migrate between polymer chains of the first and second layer when the solvent plasticizes.

10. A method for forming an orthodontic appliance, the method comprising:
thermoforming a first layer to have a first concave surface shaped to fit onto teeth;
thermoforming a second layer to have a second concave surface shaped to fit onto the first layer;
thermoforming a third layer to have a third concave surface shaped to fit onto the second layer and a convex outer surface to be exposed to an oral cavity; and
bonding the second layer to the third layer using a solvent to form a multilayer orthodontic appliance,
wherein the solvent includes one or more of a miscible or soluble therapeutic and/or one or more of a miscible or soluble wear-enhancing agent.

11. The method of claim 10, wherein the solvent is a pure or diluted alcohol, acetone, ethanol, ethanol mixture, isopropyl alcohol, eugenol, reagent alcohol, n-butyl Acetate, or amyl acetate.

12. The method of claim 10, wherein one or more of a therapeutic and/or wear-enhancing agent is added to the second layer and third layer prior to or during bonding of the second layer and third layer.

13. The method of claim 10, wherein the second layer and/or third layer comprise polyethylene terephthalate glycol (PETG).

14. The method of claim 10, wherein the second layer and/or third layer comprise thermoplastic urethane.

15. The method of claim 10, wherein the solvent is a food grade solvent.

16. The method of claim 10, wherein the solvent has a relatively low boiling point so as to evaporate completely at room temperature.

17. The method of claim 10, wherein the included one or more agent includes a flavoring agent, fluoride component, pH balancing agent, anesthetic, pharmaceutical, or vitamin.

18. The method of claim 10, wherein the solvent enables the included one or more agent to migrate between polymer chains of the second layer and third layer when the solvent plasticizes.

* * * * *